Aug. 25, 1964     J. M. LIPTAY     3,145,769
STEAM RECEPTACLE
Filed Feb. 20, 1961
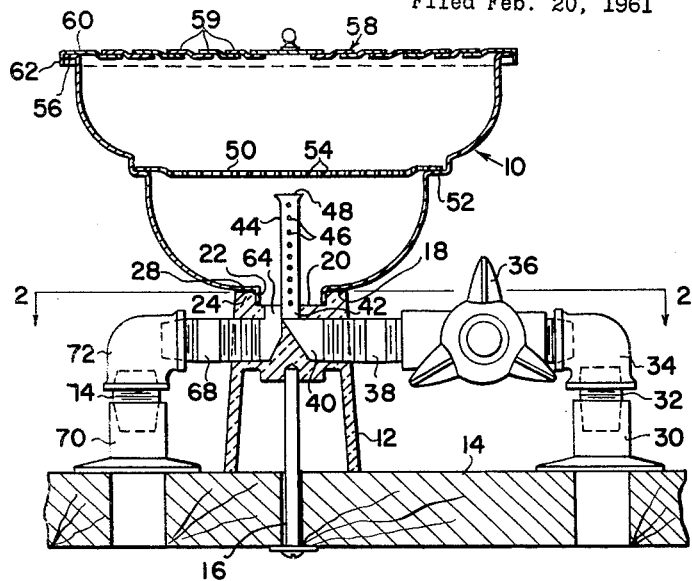
FIG. 1
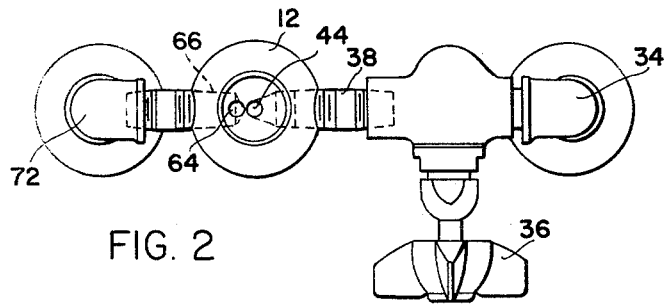
FIG. 2
FIG. 3
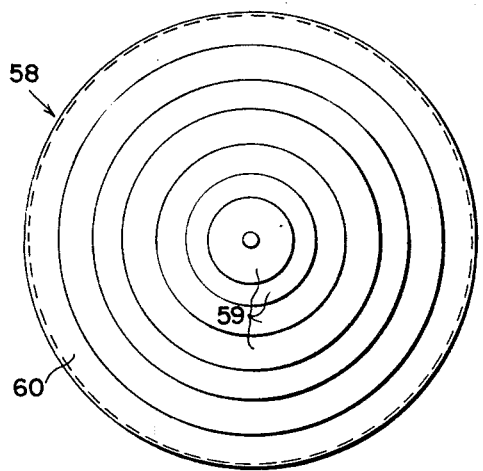
FIG. 4
INVENTOR.
JOHN M. LIPTAY
BY *Jerome Bauer*
ATTORNEY.

3,145,769
STEAM RECEPTACLE

John M. Liptay, Manhasset, N.Y., assignor to Laboratory Furniture Company, Inc., Mineola, N.Y., a corporation of New York
Filed Feb. 20, 1961, Ser. No. 90,549
2 Claims. (Cl. 165—67)

This invention relates to improvements in receptacles and particularly to means to supply fluids, such as steam into the receptacle.

Bowls and sinks in laboratories are generally specially designed and are intended to withstand wear and abuse. Many attempts have been made to increase efficiency in heating chemicals or other materials. Existent methods involve supplying steam or fluid in a solid stream from above or below a receptacle. This is not satisfactory, as uneven heating occurs and excessive wear requires rapid replacement of equipment. The instant invention has provided the solution to both deficiencies in the prior art by a simple, yet efficient expedient. By means of a tubular, preferably perforated conduit extending upwardly into the chamber of the bowl or receptacle and coupled with a lower return, an even diffused stream of steam is provided adjacent the material being heated. This insures quicker heating while corrosion is mitigated.

It is a primary object of the invention to supply fluid to a receptacle whereby the fluid will be delivered in a diffused manner.

It is another object to uniformly heat a material in a receptacle so that all portions of the material are evenly treated.

It is a specific object to heat a chemical throughout its surface whereby a uniform chemical change occurs.

It is still another object to provide an inlet port separated from the drain outlet whereby liquid may be sprayed in minute particles.

It is still yet another object to provide a perforated, tubular conduit extending upwardly into a receiving receptacle so that liquid to be heated or evaporated may be supplied out of contact with other material in the bowl or receptacle.

And it is a further object to drain material from the receptacle at a point lower than the supply means.

Other and further objects of my invention reside in the structures and arrangements hereinafter more fully described with reference to the accompanying drawings in which:

FIG. 1 is a vertical section of the steam receptacle constructed according to the teaching of the invention.
FIG. 2 is a cross-section of FIG. 1 taken along lines 2—2,
FIG. 3 is a plan view of the aluminum strainer, and
FIG. 4 is a plan view of the cover.

Referring to the figures, the receptacle or steam bowl, generally identified by the numberal 10, is mounted on a support 12. Support 12 is fastened to a table or sink 14 by any desired fastening means 16, such as a bolt or screw. The support 12 is provided with a solid section 18 having a U-shaped depression 20 in cross-section into which the annular flanged portion 22 of the stem bowl 10 is seated. The receptacle or bowl 10 may be permanently secured to the shoulder 24 on section 18 by means of solder 28 or other desirable bonding means. This serves to prevent accidental displacement of the steam bowl while in use.

An inlet supply tube 30 extends through the table 14 and receives fluid in the form of steam, from a supply source (not shown). A shoulder nipple 32 connects the supply conduit or tube 30 to a 90° elbow 34. The elbow 34 in turn connects to a straightway steam valve 36. An inlet nipple 38 extends transversely from the valve 36 and is threaded into the transverse passage 40 extending into the solid portion 18 of the support 12. The transverse passage 40 connects with the vertical passage 42.

An elongated tubular pipe 44, preferably of copper to resist corrosion, is removably mounted in the passage 40 centrally of the support 12 and section 18 and extends vertically into the steam receptacle for a considerable distance terminating at a point directly and immediately below the item to be treated. The apertures 46 extend along the length of the tubular pipe 44 and enable the steam fluid to spray out transversely in diffused form. The pinched open upper end 48 of the pipe 44 closes the remainder of the escape of steam in stream form upwardly into the receptacle.

An aluminum strainer 50 seats on an annular support ledge 52 provided in the receptacle 10 and is provided with the staggered openings 54 (see FIG. 3). Thus, steam emerging through the apertures 46 of the pipe 44 is sprayed through the strainer and is diffused over and evenly about and through the strainer surface. An annular flange 56 on the top of the receptacle 10 seats the cover generally identified by the numeral 58 composed of a number of overlapping concentric rings 59 and terminates in an outer ring 60 having a depending rim 62. The rim 62 extend downward over the flange 56 to effectively seal closed the top of the receptacle 10.

In use, each of the concentric rings 59 may be removed to provide an opening through which a test tube, vial or other member may be inserted for seating on the strainer 50. The remaining rings 59 will closely encompass the vial and thereby prevent the loss of steam by evaporation from the top of the receptacle 10. The aluminum strainer 50 supports the vial or test tube immediately above the steam pipe 44. Thus, if the vial or test tube (not shown) extends above the upper edge of the steam bowl 10, the remainder of the concentric rings 59 snugly fit around the outer surface of the test tube to hold it in position in substantially sealed manner.

A drain opening or outlet 64 is provided in the base of the receptacle 10, generally diametrically opposed to the inlet 42, and extends downwardly into the section 18. A connecting passage 66 extends transversely from the end of the drain outlet 64 and threadedly receives a transverse nipple 68. The nipple 68, in turn is connected to drain conduit by means of the elbow 72 and joining nipple 74. The conduit 74 extends through a suitable opening in the table 14 in a manner similar to the conduit 30.

In operation, steam enters the steam bowl 10 through the inlet conduit means described above. The valve 36 controls the supply. It should be noted that the diameter of the nipple 38 and passageway 40 is generally greater than the diameter of the copper pipe 44. In this manner, a spray of steam fluid emerges from the apertures 46 to disperse in the chamber of the receptacle. The steam sprayed through the apertures 46 permeates the entire receptacle 10 and quickly and effectively rises upward through the strainer openings 54 fully about the vial or tube seated thereon. Whatever steam condenses to liquid drips down and is withdrawn via the outlet 64 and the connected removal conduit system.

In the event the openings 46 in the tube 44 become clogged, it is a simple matter to remove the tube for cleaning purposes. In a like manner a new tube can be substituted in case the one in use deteriorates.

It is obvious that, while herein the invention has been illustrated in connection with a steam receptacle it is equally adapted for use where a fluid under pressure is supplied to a chamber.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. A steam receptacle comprising a support, a bowl-shaped receptacle mounted on said support and having a normally open end remote from said support, fluid inlet supply means in said support, fluid outlet means in said support, a fluid outlet opening defined in said one end of said receptacle communicating with said fluid outlet means, an annular support ledge defined in said receptacle vertically spaced from said support, a perforated strainer removably seated on said support ledge, and a pipe secured at one of its ends in said support and connected thereat with said fluid inlet means, said pipe being perforated along its length and extending upward from said support into said receptacle and vertically spaced below said perforated strainer.

2. A steam receptacle as in claim 1, a cover over said normally open end of said receptacle including a plurality of concentric overlapping rings each increasing in diameter from the center and each being removably seated on the next adjacent larger diameter concentric ring.

References Cited in the file of this patent

UNITED STATES PATENTS

| | | |
|---|---|---|
| 335,663 | Wernet | Feb. 9, 1886 |
| 410,703 | Avery | Sept. 10, 1889 |
| 441,497 | Leland | Nov. 25, 1890 |
| 1,317,045 | Shawley | Sept. 23, 1919 |